(12) United States Patent
Arndt

(10) Patent No.: US 11,394,263 B2
(45) Date of Patent: Jul. 19, 2022

(54) SUPERCONDUCTIVE ELECTRIC COIL DEVICE AND ROTOR COMPRISING A COIL DEVICE

(71) Applicant: Siemens Energy Global GmbH & Co. KG, Munich (DE)

(72) Inventor: Tabea Arndt, Erlangen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/050,436

(22) PCT Filed: Apr. 18, 2019

(86) PCT No.: PCT/EP2019/060082
§ 371 (c)(1),
(2) Date: Oct. 24, 2020

(87) PCT Pub. No.: WO2019/206801
PCT Pub. Date: Oct. 31, 2019

(65) Prior Publication Data
US 2021/0143694 A1 May 13, 2021

(30) Foreign Application Priority Data
Apr. 27, 2018 (DE) ...................... 10 2018 206 564.0

(51) Int. Cl.
*H02K 3/24* (2006.01)
*H01F 6/06* (2006.01)
(Continued)

(52) U.S. Cl.
CPC ................. *H02K 3/24* (2013.01); *H01F 6/06* (2013.01); *H02K 3/527* (2013.01); *H02K 55/04* (2013.01);
(Continued)

(58) Field of Classification Search
CPC .. H02K 3/00; H02K 3/24; H02K 3/50; H02K 3/52; H02K 3/527; H02K 55/04
(Continued)

(56) References Cited

U.S. PATENT DOCUMENTS 4,965,247 A    10/1990  Nishiguchi
4,996,508 A *  2/1991   Hed ........................ H01F 6/006
                                                    335/216
(Continued)

FOREIGN PATENT DOCUMENTS

DE           19958727 A1    6/2001
DE         102011056008 A1  6/2013
(Continued)

OTHER PUBLICATIONS

Okano et al., English Machine Translation of JP H08130134 (Year: 1994).*
(Continued)

*Primary Examiner* — Rashad H Johnson
(74) *Attorney, Agent, or Firm* — Wolter Van Dyke Davis, PLLC

(57) ABSTRACT

An electric coil device includes a winding support which is made of an elongated hollow tube that has the shape of a ring such that a higher-order loop of the winding device is formed entirely by the annular shape of the winding support, and a winding which is made of a superconductive conductor and is attached to the winding support. The superconductive conductor is wound in a helical manner about the hollow tube in a plurality of individual windings such that at least one higher-order winding of the entire helix is produced by the annular shape of the winding support. The interior of the hollow tube is designed as a coolant channel for circulating a fluid coolant. A rotor for an electric machine includes at least one such coil device.

18 Claims, 5 Drawing Sheets

(51) Int. Cl.
   *H02K 3/52* (2006.01)
   *H02K 55/04* (2006.01)
   *H02K 3/00* (2006.01)
   *H02K 3/50* (2006.01)

(52) U.S. Cl.
   CPC .................. *H02K 3/00* (2013.01); *H02K 3/50* (2013.01); *H02K 3/52* (2013.01)

(58) Field of Classification Search
   USPC ................................... 310/52, 54, 58, 59, 64
   See application file for complete search history.

(56) References Cited

U.S. PATENT DOCUMENTS

| | | | |
|---|---|---|---|
| 8,664,809 | B2 | 3/2014 | Rico et al. |
| 9,431,864 | B2 | 8/2016 | Rico et al. |
| 2003/0102770 | A1 | 6/2003 | Laskaris |
| 2006/0293189 | A1* | 12/2006 | Ries ........................ H02K 55/04 505/100 |
| 2009/0058592 | A1* | 3/2009 | Leghissa ............... H01F 41/048 336/225 |
| 2014/0171330 | A1* | 6/2014 | Kummeth ............... H02P 29/60 318/473 |
| 2015/0340139 | A1* | 11/2015 | Arndt ...................... H01F 41/12 505/211 |
| 2018/0204671 | A1 | 7/2018 | Arndt et al. |
| 2021/0143694 | A1* | 5/2021 | Arndt ...................... H02K 55/04 |
| 2021/0336498 | A1* | 10/2021 | Kummeth .............. H02K 55/04 |

FOREIGN PATENT DOCUMENTS

| | | |
|---|---|---|
| DE | 102014114451 A1 | 4/2016 |
| EP | 3292554 A1 | 3/2018 |
| FR | 1270987 A | 9/1961 |
| JP | H08130134 A | 5/1996 |
| WO | 2017005619 A1 | 1/2017 |

OTHER PUBLICATIONS

Willi et al., English Machine Translation of DE19958727A1 (Year: 2001).*

PCT International Search Report and Written Opinion of International Searching Authority dated Aug. 9, 2019 corresponding to PCT International Application No. PCT/EP2019/060082 filed Apr. 18, 2019.

* cited by examiner

SUPERCONDUCTIVE ELECTRIC COIL DEVICE AND ROTOR COMPRISING A COIL DEVICE

CROSS REFERENCE TO RELATED APPLICATIONS

This application is the US National Stage of International Application No. PCT/EP2019/060082 filed 18 Apr. 2019, and claims the benefit thereof. The International Application claims the benefit of German Application No. DE 10 2018 206 564.0 filed 27 Apr. 2018. All of the applications are incorporated by reference herein in their entirety.

FIELD OF INVENTION

The present invention relates to an electrical coil device having a winding carrier and having a winding which is applied to the winding carrier and which is composed of a superconductive conductor and having a coolant channel for the circulation of a fluid coolant. The invention furthermore relates to a rotor for an electric machine having a coil device of said type.

BACKGROUND OF INVENTION

Superconductive electrical coil devices which are used as exciter coils in rotors of electric machines are known. In order, during the operation of such a machine, to cool the coil device to a cryogenic operating temperature below the transition temperature of the superconductor used, such a rotor commonly also has a cooling system. Such a cooling system may for example comprise one or more coolant channels in which a fluid (that is to say a liquid or gaseous) coolant circulates. In such cases, it is important that there is a good thermal connection between the coil device to be cooled and the fluid coolant. Many such rotors have a supporting rotor core on which one or more superconductive coil devices are held. In many cases, said rotor core is likewise cooled to the cryogenic operating temperature. The rotor is then a substantially completely cooled rotor.

Alternatively, it is however basically also possible for the rotor core to be at a relatively warm temperature level during operation, and for only the direct surroundings of the superconductive coil device to be locally cooled. Such a variant is described in more detail for example in the US patent specifications U.S. Pat. No. 9,431,864B2 and U.S. Pat. No. 8,664,809B2. According to said two documents, the superconductive exciter coils may be fastened by means of holding loops, which exhibit relatively poor thermal conductivity, to a relatively warm magnetically soft rotor core. In this case, too, in the region of the superconductive coils, there are arranged coolant channels in which a fluid coolant can flow and thus cool the coils to a cold operating temperature. One advantage of such a warm rotor core is that no additional cooling outlay for the cryogenic cooling system is incurred for the losses in said region of the rotor. However, good thermal insulation and a reliable transmission of torque must be ensured for different spatial directions between the warm rotor core and the superconductive coils. This can lead to relatively high outlay on equipment for the holding of the individual coils, for example to the need to provide holding loops for different directions.

The main demands placed on a superconductive coil device of such a rotor, and in particular also on the connection of the coil device to the other rotor components, lie firstly in the region of the thermal insulation and of the coupling of the coils to a cooling system, and secondly in the region of the mechanical stability required for the operation of the rotor. This is to be understood firstly to mean the mechanical stability of the coil mounting, which is subjected to intense centrifugal forces and also intense electromagnetic forces in particular at high rotational speeds and/or in the case of high levels of machine power. Secondly, the mechanical stability of the superconductive coil device is also to be understood to mean that the superconductive conductor itself is not subjected to any mechanical damage both during the production of the coil and during operation. This also includes that the tolerable bend radii of the superconductive conductor are not undershot. Many known superconductive conductors and in particular superconductive strip conductors are sensitive to intense local bending, in particular to bending within the strip conductor plane. Such boundary conditions must likewise be taken into consideration in the design of the coil winding. On the other hand, it is however desirable in many applications to realize the most compact possible coil geometry, and in particular the most compact possible winding heads. Here, the winding heads are to be understood generally to mean those coil regions at which the axial coil segments (which are oriented along the main axis of the machine) are electrically connected to one another by connecting segments. Compact winding heads are a major prerequisite in order to be able to provide machines which are as small and lightweight as possible, and in particular machines with a high power density. In particular in the case of racetrack coils composed of superconductive strip conductors, the space requirement for the winding heads is often relatively great owing to the low bending capability of strip conductors.

SUMMARY OF INVENTION

It is therefore an object of the invention to specify an electrical coil device which overcomes the stated disadvantages. In particular, it is sought to provide an electrical coil device which is mechanically stable, in the case of which the superconductor can be reliably cooled to a cryogenic operating temperature, and which simultaneously has a small space requirement in the region of the winding heads. It is a further object to provide a rotor for an electric machine having the corresponding characteristics.

Said objects are achieved by means of the electrical coil device and by means of the rotor described herein.

The electrical coil device according to the invention has a winding carrier which is formed from an elongate hollow tube. Said hollow tube is shaped in the manner of a ring, such that, overall, a superordinate loop of the coil device is formed by the ring shape of the winding carrier. Furthermore, the coil device has a winding which is applied to the winding carrier and which is composed of a superconductive conductor. The superconductive conductor is wound in a multiplicity of individual turns helically around the hollow tube, such that the ring shape of the winding carrier results in at least one superordinate turn of the overall helix. The interior of the hollow tube is in this case designed as a coolant channel for the circulation of a fluid coolant.

In other words, there is a nesting of two windings within the coil device: a first, subordinate winding is provided by the multiplicity of individual turns of the conductor around the winding carrier, wherein a helical winding is present here overall. A second, superordinate winding is predefined by the ring shape of the winding carrier, whereby the helix wound on the winding carrier is, as a whole, present in at least one loop—and thus at least one superordinate turn. In particular, the helical winding may extend over a major part of the length of the ring-shaped hollow tube, and particularly advantageously even over the entire circumference of the ring. It is hereby achieved that one complete (superordinate) turn loop of the superconductive conductor is formed from the (subordinate) helical winding. Altogether, this results in net transport of current along the local direction of the hollow tube.

It is in principle and generally advantageously possible for the winding carrier to be present in the form of a closed ring, such that exactly one superordinate loop (and thus exactly one superordinate turn) is thus formed by the shape of the winding carrier. Alternatively, it is however basically also possible for the winding carrier to be not completely closed but merely of substantially ring-shaped form. It is thus possible for there to be a relatively small open region of the winding carrier, which may optionally be closed by a separate connecting piece. It is however basically also possible for the superordinate winding to comprise not only a single turn but a multiplicity of such turns. For this purpose, it is possible in particular for multiple helical windings lying one on top of the other to be applied to a closed ring-shaped winding carrier, such that, in turn, for the conductor, multiple superordinate turns (in this case composed of the individual layers of the helix) are formed overall.

The coolant channel in the interior of the hollow tube may be designed in particular for the circulation of liquid or gaseous coolant within an altogether closed coolant circuit of the rotor. For this purpose, the coolant channel may in particular have lateral (that is to say non-tangential) connections through which such a fluid coolant can be introduced and discharged.

A major advantage of the coil device according to the invention lies in the fact that the winding carrier in the form of a hollow tube both imparts mechanical stability to the superconductive conductor wound thereon and also permits reliable cooling. By contrast to conventional exciter coils in superconductive rotors, in the case of which the superconductive coils are commonly formed as impregnated or potted ribbon coils composed of superconductive strip conductors, the coil winding itself in this case does not need to be of self-supporting design. In other words, the coil winding is not an inherently stable component, but rather the individual turns of the helical winding are mechanically held by the winding carrier, and under some circumstances the winding is not dimensionally stable without the carrier. This offers the advantage that the superconductive conductor itself can be designed to be of mechanically lower strength, and in particular thinner, in relation to the prior art. In particular, the impregnation compound or potting compound of the coil winding, such as is conventional in the prior art, can be omitted. By means of such a not inherently stable design of the winding, it can be achieved as a further advantage that the individual turns can be cooled more easily and more efficiently.

This is generally advantageously achieved in the case of the coil device according to the invention in that a cooling action is imparted via the hollow tube, which bears the winding, itself. For this purpose, the interior space of the hollow tube is formed as a coolant channel. Owing to this spatial vicinity of a cryogenic coolant, efficient cooling of the superconductive conductor can be achieved in a particularly simple manner. A further advantage of this particularly close thermal connection of the conductor to the fluid coolant lies in the fact that, by means of the cooling from the winding interior, the brief formation of local hotspots (that is to say hot points that are formed during the operation of the superconductor either owing to quenching processes or transient operating states or faults) can be tolerated and withstood without a breakdown of the superconductive characteristics of the entire coil winding. In the case of the construction according to the invention, such a breakdown can be avoided by virtue of the coil turns being thermally closely coupled to the supercooled coolant via the hollow tube of the winding carrier. Furthermore, the coil turns can, in a radially outward direction, be thermally insulated with respect to the externally situated warm surroundings in an effective manner. An embodiment of the hollow tube, which bears the winding, with relatively high thermal conductivity and/or high heat capacity thus advantageously contributes to the avoidance of such a breakdown. The material and inner diameter and outer diameter of the hollow tube can advantageously be dimensioned so as to yield a good thermal connection with simultaneously sufficiently high heat capacity and low flow resistance for the coolant.

A further advantage of the embodiment according to the invention in relation to the prior art can be seen in the fact that, for the at least one superordinate coil turn, relatively small bend radii can be tolerated at least in partial regions, and thus relatively compact winding heads can be realized for the winding overall. This advantage arises from the fact that, during the production of a helical winding from the superconductive conductor, smaller bend radii can be tolerated, both for the uniform bending of the conductor within the subordinate helical turns and for the superordinate bending of the helix as a whole, than for example for the bending of a strip conductor within the strip plane. However, a locally tightly confined bend perpendicular to the conductor plane—for example in one of the corners of a rectangular coil according to the prior art—can also have a more critical effect than a uniformly tight winding with small bend radii within the helix.

Altogether, by means of the invention, a coil device is provided which advantageously is both mechanically stable and can also be cooled in an effective and reliable manner and configured with compact winding heads.

The rotor according to the invention has at least one such coil device according to the invention. Here, the advantages of the rotor according to the invention arise analogously to the above-described advantages of the coil device according to the invention.

Advantageous embodiments and refinements of the invention will emerge from the dependent claims and from the following description. Here, the described embodiments of the coil device and of the rotor may generally be advantageously combined with one another.

Accordingly, the coil device generally advantageously has a coil axis, which may in particular be a coil longitudinal axis of a coil of elongate form. The coil device may in this case have two axial coil members, which extends substantially in an axial direction. These may particularly advantageously be straight axial coil members, which extend parallel to the coil axis. Alternatively, the axial coil members may however also be of bent or kinked form, such that individual subregions may have a slight angle with respect to the coil axis. Such an angle $\beta$ may advantageously lie in a range of up to $\beta=\arctan(W/L)$, wherein W is the maximum width of the coil (perpendicular to the longitudinal axis) and L is the length of the coil.

The general embodiment with axial coil members is particularly advantageous for the use of the coil device as a rotor coil in a rotating electric machine. In such an application, it is primarily those coil members which are oriented axially with respect to the machine axis that are of importance for the electromagnetic interaction between rotor and stator. In the case of such an application, it is possible in particular for the coil longitudinal axes of a multiplicity of such coil devices to each run parallel to the central rotor axis (and thus the machine axis).

It is generally advantageously possible that, within the axial coil member, the superconductive conductor forms a local angle $\alpha$, which lies in the range of up to 89.4°, with the coil axis. Although the coil members as a whole lie parallel to the coil axis, the superconductive conductor itself does not run parallel to said axis owing to the subordinate helical winding. For the electromagnetic interaction in an electric machine, it is however advantageous if the present conductor forms as small an angle as possible with the machine axis. This is achieved by means of the abovementioned advantageous angle range for the conductor within the helical winding. The magnitude of the angle of the conductor with the longitudinal axis within the axial conductor member is particularly advantageously substantially equal. Within the helix, only the local orientation of the conductor with respect to the longitudinal axis changes. It is however basically also possible for the magnitude of the angle to vary. In such cases, said angle range should as far as possible not be undershot for the entire axial coil member.

The angle $\alpha$ may particularly advantageously lie in the range between 11° and 89.5°, in particular in the advantageous subrange between 11° and 79° or in the particularly advantageous subrange between 11° and 22°. The values mentioned by way of example for the angle $\alpha$ may in this case be attained in particular by way of the following parameters: an angle $\alpha$ of approximately 11° may be realized for example in the case of an outer radius of the hollow tube of 10 mm, a conductor width of 20 mm and a thread pitch of 200 mm. An angle $\alpha$ of approximately 22° may be realized for example in the case of an outer radius of the hollow tube of 10 mm, a conductor width of 20 mm and a thread pitch of 100 mm. An angle $\alpha$ of approximately 79° may be realized for example in the case of an outer radius of the hollow tube of 10 mm, a conductor width of 4 mm and a thread pitch of 8 mm. An angle $\alpha$ of approximately 89.5° may be realized for example in the case of an outer radius of the hollow tube of 50 mm, a conductor width of 2 mm and a thread pitch of 2 mm. The parameter combinations of the stated examples are dimensioned such that, in the presence of torsion within the helical winding, the limit values for irreversible strain ($\varepsilon_{irr}$) of superconductive strip conductors are adhered to, which may lie for example in the range between $\varepsilon_{irr}$=0.2% to 2%. In general, and in each case irrespective of the stated combinations with other parameter values, the conductor width may advantageously lie in the range between 2 mm and 20 mm, in particular between 4 mm and 12 mm. In general, and in each case irrespective of the stated combinations with other parameter values, the thread pitch of the helix may lie in the range between 1 and 10 times the value of the conductor width, in particular in the range between 2 and 5 times said value. In order to attain an as far as possible substantially axially oriented geometry of the individual conductors in accordance with the stated angle range, it is advantageous if the helical winding is formed with a relatively large thread pitch. In other words, the subordinate individual turns of the helical winding should not be wound too tightly overall. This applies in particular to the abovementioned axial members, but optionally also to connecting members that may additionally be present.

In general, the coil device may, in addition to the two stated axial conductor members, have two axially end-side connecting members. By means of this total of four coil members that is then provided, it is then possible for an altogether closed ring-shaped coil device to be defined. Such a coil device may for example have, overall, the basic shape of a rectangular coil (optionally with slightly rounded corners), a coil of oval shape, or a racetrack coil.

According to a first advantageous embodiment, the end-side connecting members may each be formed as straight members. In this embodiment, it is that even possible for the entire coil to advantageously run within one coil plane. Thus, here, a particularly simple coil geometry is realized, which can also facilitate the arrangement and hold of the coil device on a mechanically supporting rotor body.

Alternatively, according to a second advantageous embodiment, the end-side connecting members may however also each be formed as bent members. In particular, said connecting members may be bent out of the plane of the axial members. For example, such a bend may be a bend about a central rotor axis of a superordinate rotor, such that the coil members of the coil device run, overall, on a common cylinder lateral surface. In this way, for example, space for the rotor shaft is created in the center of a rotor unit.

It is generally advantageously possible for the hollow tube that supports the subordinate helical winding to have a round cross-sectional shape. Such a round cross-sectional shape in particular on the outer side of the hollow tube facilitates the application of a helical winding composed of a superconductive conductor, without the need for said conductor to be kinked to an excessive extent. The outer side of the hollow tube may particularly advantageously have an approximately circular cross section, which then leads to a particularly symmetrical shape of the helical winding. The outer side of the hollow tube may advantageously have one or more helically encircling grooves into which the helically wound superconductive conductor can be laid.

The inner surface of the hollow tube may also generally advantageously be formed with a round and in particular circular cross section in order to allow a circulation of fluid coolant in the interior of the hollow tube with low resistance.

The hollow tube may generally advantageously have an inner diameter of 50 mm or less. In particular, the inner diameter may lie in the range from 2 mm to 20 mm. A correspondingly narrow coolant channel is defined in this way. Adequately high cooling power can be attained in this range. The outer diameter may correspondingly lie for example in the range from 4 mm to 100 mm, particularly advantageously in the range between 10 mm and 50 mm. In the case of pipe cross sections which are not exactly circular, the stated diameters are to be understood analogously to mean the respectively largest inner or outer dimension.

The abovementioned superconductive conductor may generally comprise one or more superconductive strip conductors. Such a strip conductor may have a relatively thin superconductive layer on a carrier substrate.

The superconductive conductor in general (and in particular a superconductive strip conductor) may particularly advantageously have a high-temperature superconductive material. High-temperature superconductors (HTS) are superconductive materials with a transition temperature above 25 K and, in the case of some material classes, for example cuprate superconductors, above 77 K, in the case of which the operating temperature can be attained by cooling with cryogenic materials other than liquid helium. HTS materials are therefore particularly attractive also because, depending on the selection of the operating temperature, said materials can have high upper critical magnetic fields and high critical current densities.

The high-temperature superconductor may for example have magnesium diboride and/or an oxide ceramic superconductor, for example a compound of the type $REBa_2Cu_3O_x$ (REBCO for short), wherein RE stands for an element of the rare earths or a mixture of such elements.

In the embodiment with a superconductive strip conductor, the conductor may in particular also be formed by a stack of multiple strip conductors lying one on top of the other and/or adjacent to one another. In this embodiment, an even higher current-carrying capability can be attained for the individual conductor turns.

The respective individual superconductive strip conductor (which may in particular be part of a stack) may particularly advantageously have a thickness of only 150 μm or less, in particular even in the range of 100 μm or less. In comparison with typical superconductive rotor windings, this embodiment involves a relatively thin design of the strip conductor. This is advantageously made possible in conjunction with the present invention because the strip conductor itself does not need to have any inherently stable mechanical characteristics, but is rather mechanically supported by the hollow tube around which the helix is wound. An advantage of such a relatively thin conductor design is that, in this way, during the winding of the helical winding, the relatively small bend radii required here can be attained without damage being done to the superconductive conductor. The thinner the individual strip conductor is overall, the tighter the bends that are typically possible overall. A further independent advantage of relatively small conductor thicknesses can be seen in the relatively high current density of the winding wound therefrom.

In order to attain the abovementioned small overall thickness of the strip conductor, it is possible in particular for a substrate of the strip conductor and/or one or more stabilizing layers of the strip conductor to be of relatively thin form in relation to the prior art. For example, the carrier substrate of the strip conductor may thus have a thickness of only 75 μm or less, in particular even only at most 50 μm or even only at most 25 μm. The electrical stabilizing layers that are optionally present may for example collectively have a thickness of only 100 μm or less, in particular even only at most 50 μm or even only at most 25 μm. Such stabilizing layers are typically formed as metallically conductive layers and may cover the layer system composed of substrate, superconductive layer and optional further layers either on one side or both sides. Said stabilizing layers can perform the function of an electrical shunt in the event of a local breakdown of the superconduction. For this purpose, a certain minimum thickness is typically required. In conjunction with the present invention, said thickness can however be selected to be considerably smaller than in the prior art, because such a shunt function can advantageously also be jointly performed by an optionally electrically conductive hollow tube.

In general, the superconductive conductor may, at least in certain portions, have a relatively small bend radius which is determined by the outer diameter of the hollow tube and the selected thread pitch. In this way, it is possible overall to attain a relatively compact geometry of the entire coil device and in particular of the winding heads of the coil device. Alternatively or in addition, an altogether compact geometry can also be attained by virtue of the hollow tube that supports the helical winding having, at least in certain portions, a bend radius r of less than 100 mm, in particular even less than 50 mm. Such a tight bend of the supporting hollow tube is expedient in particular in the regions between the axial conductor members and the end-side connecting members, because in this way it is possible to attain a particularly compact geometry of the winding heads. This can be attained in particular by winding the helix onto a pre-shaped hollow tube.

The coil device may particularly advantageously be formed as a coil device for an electric machine. In particular, it may be a coil device for the rotor of an electric machine. In particular, it may be a coil device for the exciter coil of such a rotor. In the case of the embodiment as a rotor winding, said coil axis expediently lies parallel to the central machine axis and to the central rotor axis. The advantages of the embodiment according to the invention as mentioned further above are attained to particularly good effect in the case of such an application of the coil device.

In general, the electrical coil device may advantageously also have yet further elements in addition to the hollow tube, the internally situated coolant channel and the helical winding applied to the hollow tube. In particular, such additional elements may be elements which are situated radially further to the outside and which concentrically surround the helical winding and the hollow tube. For example, one or more externally situated holding elements may be arranged radially outside the helical conductor turns. Such holding elements may particularly advantageously be of electrically conductive form and thus also have an electrically shielding action. This may contribute in particular to the avoidance of electrical alternating-current losses in the layers situated further to the inside. Alternatively or in addition, a radially externally situated and in particular mechanically prestressed bandage may surround the helical winding (and optionally also one or more such holding elements) and thereby contribute to additional mechanical fixing. Such a bandage may be formed for example from an electrically nonconductive material and/or from a material with low thermal conductivity. Radially yet further to the outside, there may optionally be provided a thermal insulation layer, which may for example comprise an aerogel and/or a multi-ply insulator and/or a vacuum space. All of these abovementioned optional layers may involve concentric elements which are each present within an associated cylindrical shell layer. In this way, high mechanical stability with simultaneously good thermal insulation can particularly advantageously be achieved by means of one or more of the stated elements.

The coil device may generally have coolant connections which serve for connecting the coolant channel situated in the interior of the hollow tube to the other parts of a coolant circuit. For example, for such a hollow tube, there may be provided two such coolant connections, of which one may serve as an inlet and the other may serve as an outlet. Said connections may be arranged laterally with respect to the ring structure of the hollow tube, or in other words non-tangentially with respect to the ring.

Alternatively or in addition to the lateral connections, the coil device may advantageously have a connecting piece which serves to connect two end regions of the hollow tube to form an altogether closed ring. Such a connecting piece may alternatively be either likewise a hollow tube or else an internally closed connecting piece. Depending on the embodiment, the result is thus either a channel which, overall, is closed in a ring shape or merely a channel which is of almost continuous ring-shaped form, which then extends for example from the inlet to the outlet.

In general, the helical turn composed of the superconductive conductor may overall be electrically closed, to form a ring-shaped current circuit, via the superordinate turn of the coil device. This is expedient for example in order to operate the coil device in a continuous current mode.

Alternatively, the coil device may however also be present in the form of an open coil, which is connectable via two electrical connections in the end regions of the coil to an external electrical current circuit.

The hollow tube of the winding carrier may generally advantageously be formed from a metallic material or comprise a metallic material. A metallic material is particularly expedient in order to attain good thermal coupling of the helical turns to the coolant flowing in the interior space. For example, the hollow tube may be formed from copper or at least comprise copper, or may alternatively also comprise steel and/or aluminum. Alternatively or in addition, the material of the hollow tube may however also comprise a fiber composite material, for example a fiber-reinforced plastic. With the latter materials, it is advantageously possible to attain a low density.

According to an embodiment of the rotor, said rotor may have a number of magnetic poles n, wherein n may advantageously assume even-numbered values between 2 and 64. For this purpose, the rotor may generally comprise multiple coil devices according to the invention.

According to a further embodiment of the rotor, said rotor may have a cooling system for cooling the superconductive conductor to a cryogenic operating temperature, wherein the cooling system is configured to circulate a fluid coolant in the coolant channel of the coil device. In this way, it is particularly advantageously possible to attain an operating temperature of the superconductive conductor which lies below the transition temperature of the superconductor that is used.

The fluid coolant may in particular be liquid hydrogen, liquid helium, liquid neon, liquid nitrogen, liquid oxygen and/or liquid methane. Here, in the use of all of these cryogenic coolants, it is possible in principle for the liquid form to be present in addition to the gaseous form, and an additional cooling action can be attained as a result of an evaporation of the liquid in the region of the components to be cooled. It is thus possible for the cryogenic coolant to circulate in the interior of the hollow tube and/or in the superordinate cooling circuit in particular in accordance with the thermosiphon principle and/or in the manner of a heatpipe.

According to a an embodiment of the rotor, this may additionally have a rotor core on which the at least one coil device is mechanically held. In particular, said rotor core is then designed to be at a warm operating temperature during the operation of the rotor. In the present context, such a warm operating temperature is to be understood to mean a temperature considerably above the transition temperature of the superconductor, which may in particular lie in the vicinity of or even above room temperature. This embodiment has the advantage that not the entire rotor, but rather only one or more locally limited subregions in which one or more coil devices according to the invention are arranged, has to be cooled.

In general, the rotor core (irrespective of whether it is operated at a warm or cold temperature level) may be formed from a magnetically soft material or comprise at least one such magnetically soft material. Such a rotor core is advantageous for the magnetic flux guidance in the rotor. Alternatively, the rotor core may however also be formed from non-magnetic material and for example comprise aluminum and/or non-magnetic steel.

In order to enable one or more cryogenic superconductive windings to be held on a warm rotor core, it is expedient to fasten the at least one coil device to the warm rotor core by means of (one or more) holding elements with low thermal conductivity. For example, holding webs composed of plastic and in particular fiber-reinforced plastic and/or composed of ceramic may be used here. In principle, it is however also possible here for use to be made of a metallic material (for example steel), because the heat that is introduced is dissipated directly in the cooling tube and does not reach the superconductive conductor.

Alternatively or in addition, the individual cryogenic superconductive windings may be fastened to the warm rotor body by means of thermally insulating holding loops, similarly to the situation described in the documents U.S. Pat. No. 9,431,864B2 and U.S. Pat. No. 8,664,809B2.

Furthermore, the rotor core may advantageously have one or more grooves for receiving the coil device(s). For example, one such groove may be provided on the rotor core for each longitudinal member of the coil device. Alternatively or in addition, it is also possible for grooves to be provided for the end-side connecting members in order to guide the corresponding coil parts.

BRIEF DESCRIPTION OF THE DRAWINGS

The invention will be described below on the basis of a number of exemplary embodiments and with reference to the appended drawings, in which.

DETAILED DESCRIPTION OF INVENTION

In the figures, identical elements or elements of identical action are denoted by the same reference designations.

Figure 1:
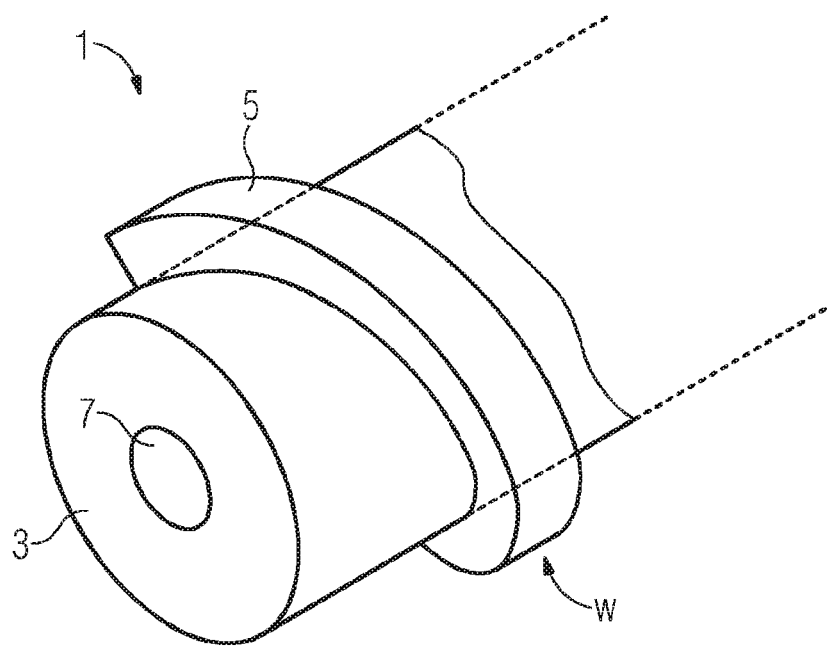
FIG. 1 is a schematic perspective illustration of a part of a helical winding on a hollow tube.

FIG. 1 is a schematic perspective illustration of a subregion of an electrical coil device 1 according to a first example of the invention. The figure shows a part of a helical winding composed of a superconductive conductor 5, which is wound on a hollow tube 3. By way of example, only a part of one turn w of the superconductive conductor around the hollow tube is shown here. Altogether, there are however a multiplicity of such turns w, which form a helical winding. In the interior of the hollow tube 3, there is formed a coolant channel 7 in which a fluid coolant can flow, such that cooling of the superconductive conductor to a cryogenic operating temperature is made possible. The hollow tube 3 may be formed from a material with good thermal conductivity, for example from copper. The conductor 5 may be electrically insulated with respect to the hollow tube 3, though this is not imperatively necessary.

Figure 2:
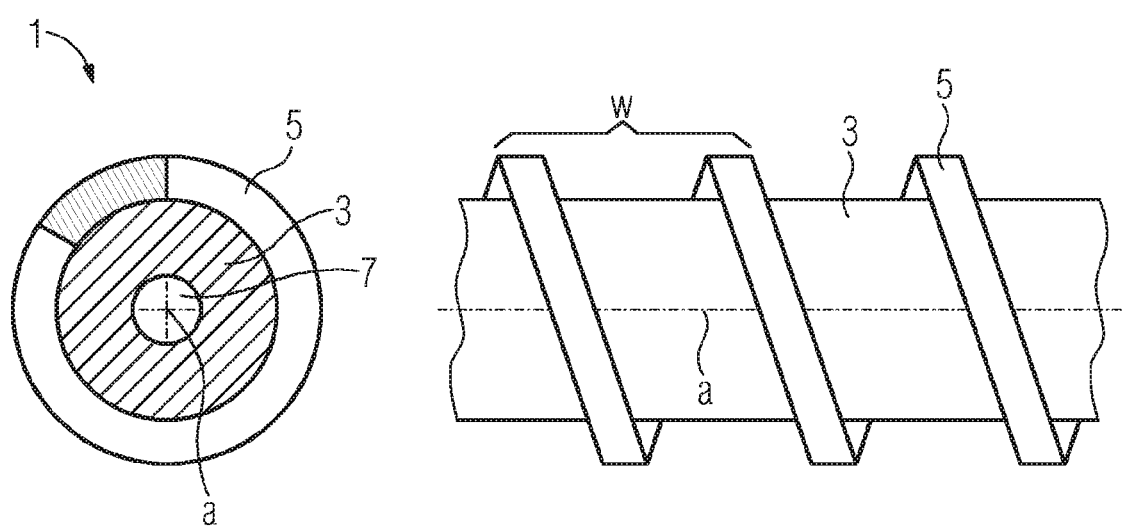
FIG. 2 shows a cross section and a schematic side view of such a helical winding.

FIG. 2 shows, on the left-hand side, a cross-sectional illustration and, on the right-hand side, a schematic side view of the coil device 1 from FIG. 1. It can be seen from the cross-sectional illustration that the helical winding has a local axis a around which the individual partial elements of the coil device are concentrically arranged. A detail with approximately two and a half turns w of the helical winding is shown in the schematic side view. The detail shown may for example be part of an altogether straight coil member, and the subordinate helical turns w form subsections on this altogether straight coil member.

Figure 3:
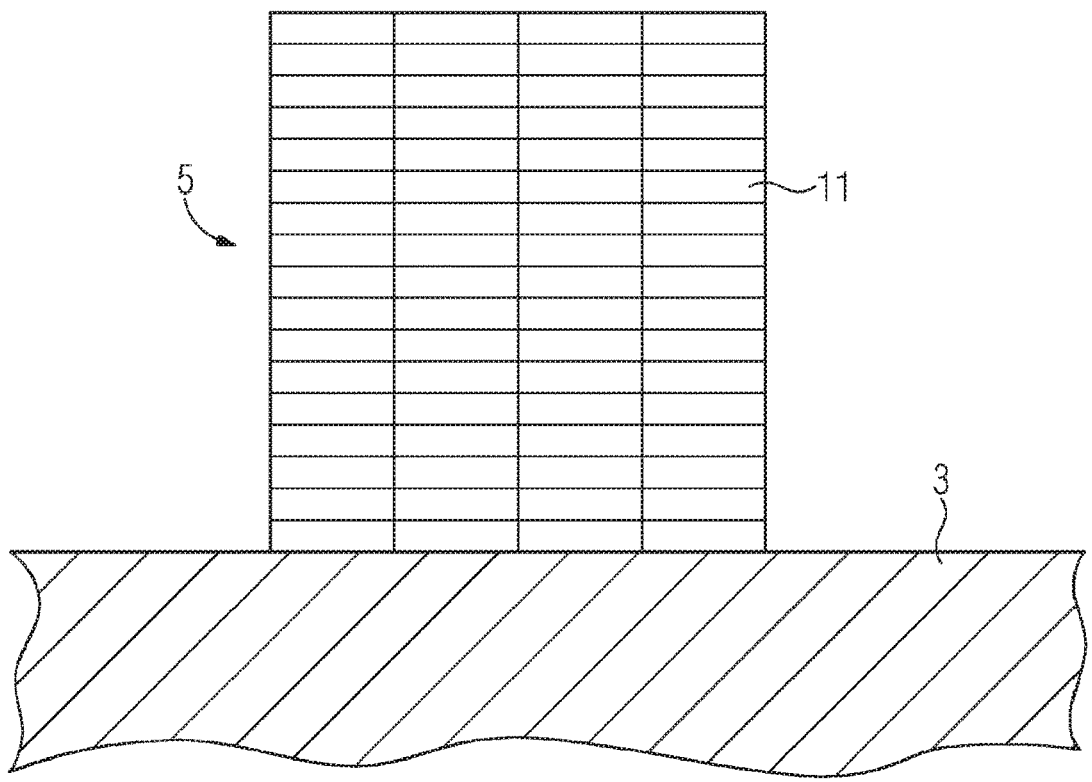
FIG. 3 is a schematic cross-sectional illustration of an assembled superconductive conductor.

The superconductive conductor 5 from FIGS. 1 and 2 may for example be assembled from multiple partial conductors 11. FIG. 3 is a schematic cross-sectional illustration of such an assembled conductor 5 which is lying on an outer surface of the hollow tube 3. In this example, the entire conductor 5 is formed by multiple stacks, situated adjacent to one another, of in each case multiple superconductive strip conductors 11 situated one above the other. Said individual strip conductors 11 comprise in each case one carrier substrate and one relatively thin superconductive layer, and optionally also further intermediate layers and/or electrical stabilizing layers. These individual strip conductors are in each case relatively very thin, such that they can be bent with relatively small bend radii to form the helical winding. By means of the configuration of the entire conductor 5 with numerous individual partial conductors 11, a very high current-carrying capability and thus a high current density are also possible overall.

Figure 4:
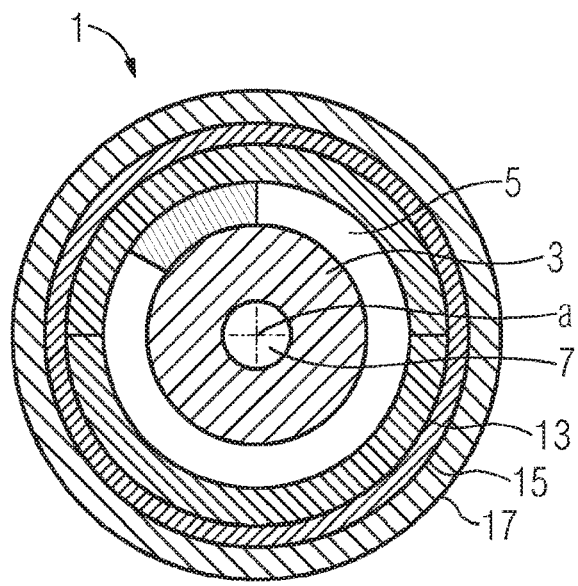
FIG. 4 is a schematic cross-sectional illustration of a helical winding according to a further example.

FIG. 4 is a schematic cross-sectional illustration of an electrical coil device 1 according to a further example of the invention. This coil device, too, comprises a helical winding composed of a superconductive conductor 5 on a hollow tube 3. In addition to the elements already shown in FIGS. 1 and 2, this coil device also comprises yet further elements which are arranged radially to the outside with respect to the conductor 5 and likewise concentrically with respect to the local axis a. Here, these are, in the sequence from the inside outward, two holding elements 13, a bandage 15 and a thermal insulation layer 17. In general, each of these elements is only optionally provided, wherein the illustrated radial sequence is however expedient overall. Holding elements 13 are formed here by two cylindrical half-shells, which in this example are each composed of metallic material and mechanically hold the conductor turns w from the outside. At the same time, the function of an electrical damper is performed owing to the electrically conductive characteristic of said holding elements 13, such that high-frequency electric fields can advantageously be shielded. The bandage 15 serves for additional mechanical fixing and may be formed for example from an electrical insulating material with poor thermal conductivity. Here, radially yet further to the outside, there is a thermal insulation layer 17, which may in particular comprise an aerogel, a multi-ply insulator and/or a vacuum-insulation sheath.

Figure 5:
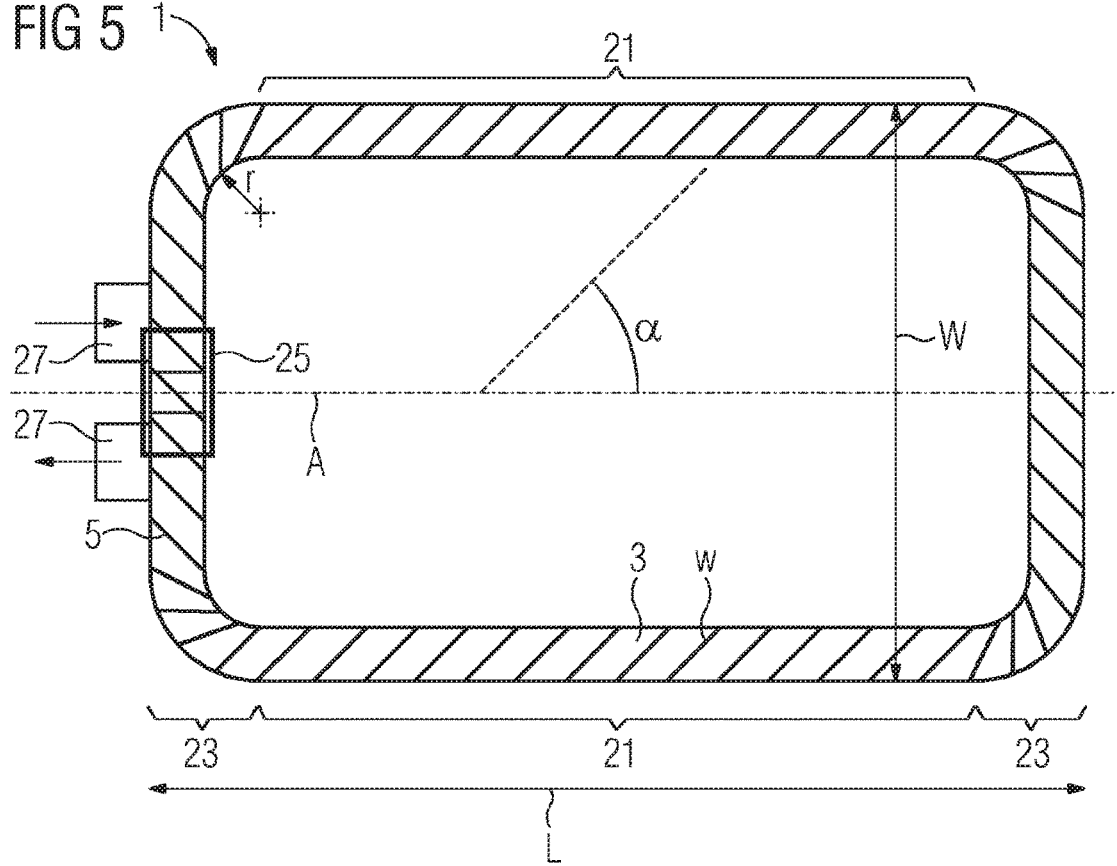
FIG. 5 shows a schematic plan view of a coil element according to an example of the invention.

FIG. 5 shows a schematic plan view of a coil element 1 according to a further example of the invention. This coil element, too, comprises a helical winding composed of a superconductive conductor 5 on a hollow tube 3. Locally, said winding may be of similar construction to that shown in FIGS. 1 and 2. The conductor 5 may, similarly to that in FIG. 3, be in the form of an assembled conductor. The optional layers from the example of FIG. 4 may also additionally be arranged radially on the outside around the conductor 5, though these are not illustrated here for the sake of clarity. It is essential that the helical winding composed of a multiplicity of individual turns w forms, overall, a superordinate ring-shaped loop. In the example shown, said loop is defined by an altogether closed rectangular coil shape into which the helix as a whole is bent. Said superordinate coil form has, in the example shown, two straight axial segments 21 which each run parallel to the longitudinal axis A of the coil device. Additionally, the coil has two axially end-side connecting members 23, resulting overall in a closed ring. Electrically, either the superconductive conductor may be closed to form a short-circuit ring, or electrical contact points (not shown here) may be provided such that the superordinate coil can, overall, be connected to an external electrical circuit.

The coil device 1 of FIG. 5 is not illustrated true to scale. In particular, the length ratio of the individual coil members may be selected to be considerably different and, for example, the axial conductor members 21 may be configured to be considerably longer than is shown here. The lead of the individual conductor turns within the helical winding is also not illustrated true to scale. For the electromagnetic interaction of such a coil device 1 in an electric machine, it is generally advantageous if the individual conductor portions of the superconductive conductor 5 (and in particular also the corresponding portions of the partial conductors present therein) enclose as small an angle $\alpha$ as possible with the longitudinal axis of the coil. $\alpha$ may for example, in the region of the axial coil members, generally advantageously lie below 79 degrees.

The rectangular coil shown in FIG. 5 has the shape of a rectangle with rounded corners. Here, the bend radii r in the region of the corners are relatively small in relation to conventional superconductive coils. This is made possible both through the use of relatively thin strip conductors and by the fact that it is not the superconductive conductor 5 itself but rather the hollow tube 3 which supports the helical winding that is bent with this tight bend radius r. The local bend radius of the superconductive conductor 5 within the helical winding may differ from this bend radius of the superordinate coil form. Furthermore, even in the case of a tight bend within the helical winding, unfavorable bending of the strip conductor—specifically a tight bend within the strip conductor plane—is advantageously avoided.

The coil element 1 of FIG. 5 additionally has, in the left-hand region of the figure, a connecting piece 25 and two lateral coolant connections 27. The connecting piece 25 may for example be formed from copper or high-grade steel and serves for connecting the two end pieces of the hollow tube, which has been shaped to form a superordinate loop, to form an altogether closed ring. The coolant connections 27 arranged laterally in relation to said ring serve for the introduction and discharge of the fluid coolant into and out of the internally situated coolant channel 7.

Figure 6:
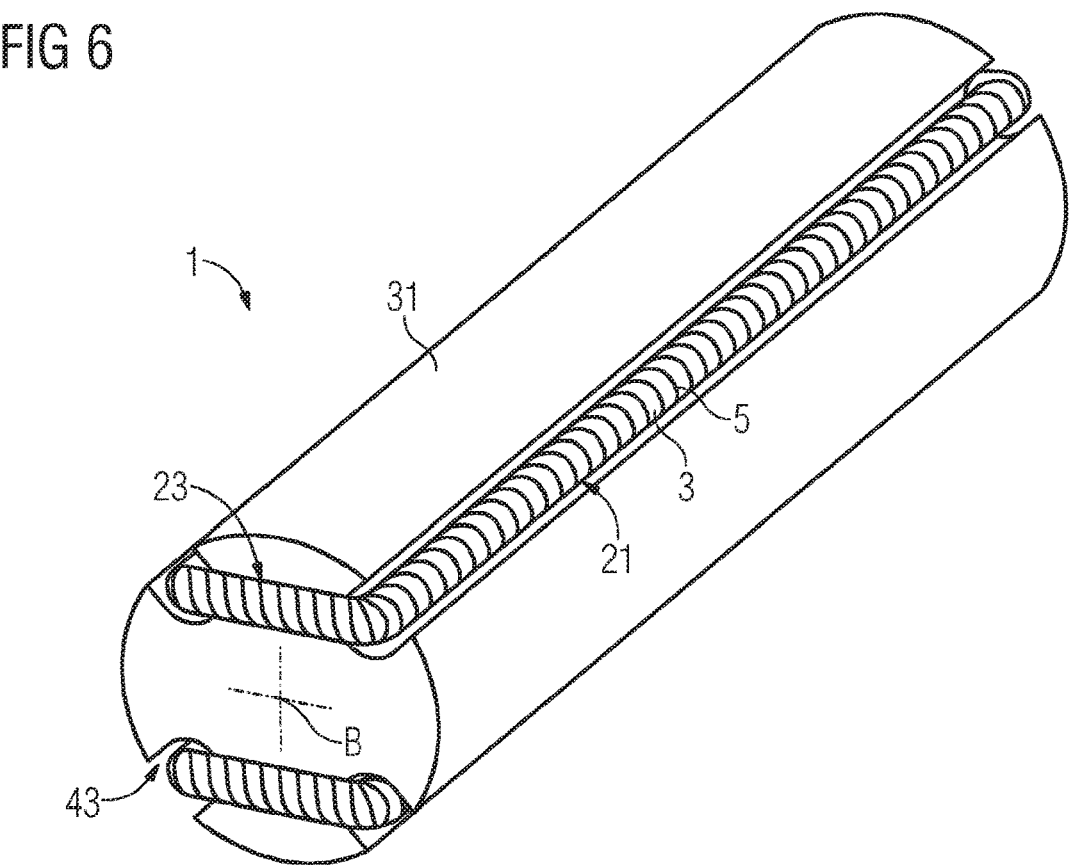
FIG. 6 is a schematic perspective illustration of a coil element on a rotor core.

FIG. 6 is a schematic perspective illustration of a coil element 1 which is arranged on a rotor core 31. Here, only an upper half of the rotor core 31 is shown. The coil element 1 may, overall, be of similar construction to that in the example of FIG. 5, wherein the two longitudinal members 21 are in this case of relatively longer form. The coil device 1 is held in a suitable groove 43 of the rotor core. The superconductive conductor 5 may advantageously be cooled to a cryogenic operating temperature during the operation of the rotor by the coolant flowing in the hollow tube. The rotor core 31 may, by contrast, be at a warm temperature level during operation. For this purpose, the mounting of the coil device 1 on the rotor core 31 may be realized by means of elements with low thermal conductivity, as will become even clearer for example in conjunction with FIG. 7. Owing to the small bend radii of the coil device 1 and the pronounced rectangular shape, it is achieved that an altogether small space requirement for the axially end-side connecting members 23 and thus for the winding heads is realized in a rotor of said type. In this way, an altogether compact design of the rotor is made possible.

Figure 7:
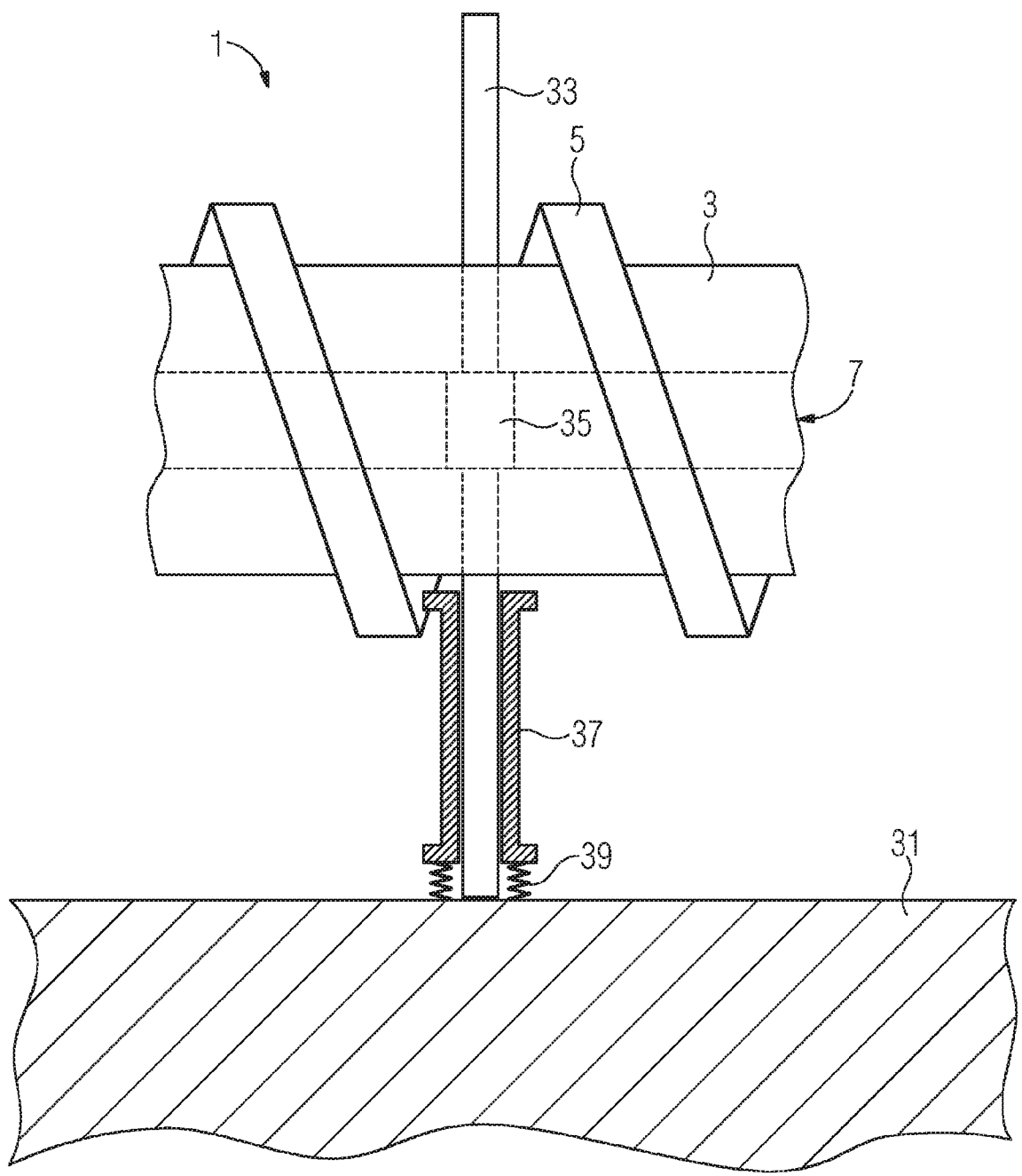
FIG. 7 shows a detail view of the coil element of FIG. 6.

FIG. 7 shows a detailed view of the coil element 1 of FIG. 6. The mounting of said coil element 1 on the warm rotor core 31 is shown here. In order to thermally insulate the cold superconductive conductor 5 and the likewise cold hollow tube 3 with respect to the relatively warm rotor core 31, a holding pin 33 composed of a material with relatively low thermal conductivity is provided for the mechanical mounting. Said holding pin may, as indicated by dashed lines, extend through the hollow tube 3. An optional sleeve 37, which likewise has low thermal conductivity, is additionally provided here, which acts as a spacer element between the coil device 1 and the rotor core 31. One or more spring elements 39 may optionally be provided between the sleeve 37 and the rotor core 31. In the region of the internally situated coolant channel 7, the holding pin 33 may be guided by a guide tube 35 running perpendicular to the coolant channel, such that direct contact of the holding pin 33 with the cryogenic coolant is advantageously avoided. Altogether, the coil element 1 may be fixed to the warm rotor core 31 by means of a multiplicity of holding devices of identical or similar design. A mechanically stable and thermally decoupled mounting is thus attained.

Figure 8:
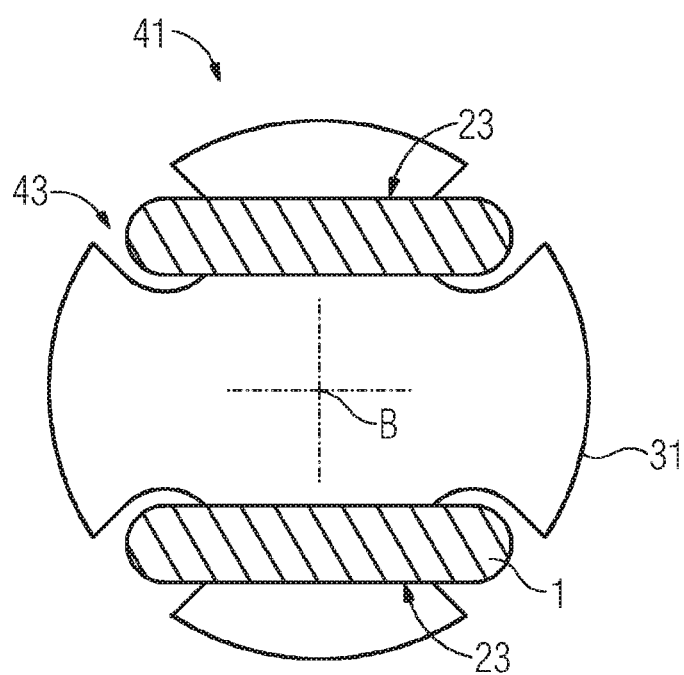
FIG. 8 is a schematic illustration of a first exemplary embodiment of a rotor.

FIG. 8 is a schematic illustration of an exemplary embodiment of the rotor 41 according to the invention. A plan view from one of the axial end regions of the rotor is shown. The rotor 41 that is shown comprises a rotor core 31 which has a substantially cylindrical shape and a central rotor axis B. Said rotor 41 has two coil devices 1 according to the invention, which have each been laid into corresponding grooves 43 of the rotor core 31. The embodiment of the coil device 1 may, overall, be similar to those in the preceding examples. The mounting may also be configured similarly to that in the context of FIG. 7. In the example of FIG. 8, the two coil devices 1 are each in the form of rectangular ribbon coils, wherein the end-side coil members 23 are each of straight form and lie within a common coil plane.

Figure 9:
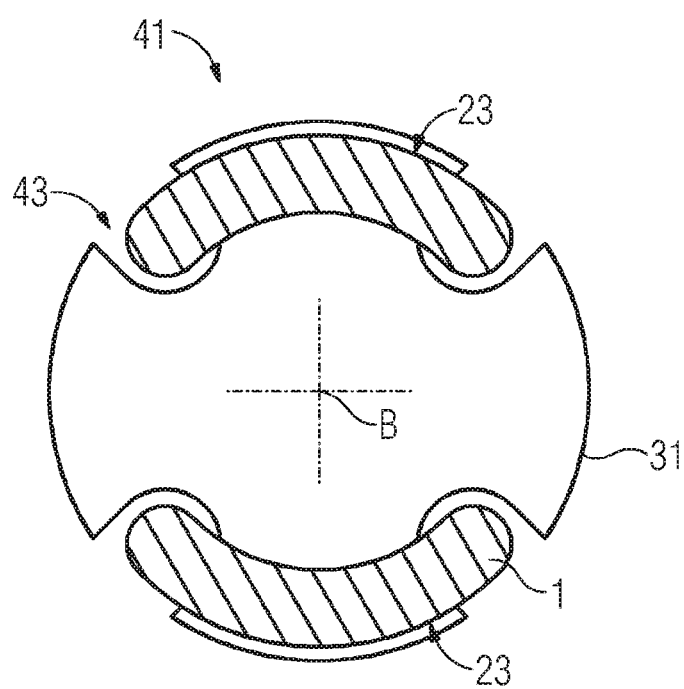
FIG. 9 is a schematic illustration of a second exemplary embodiment of a rotor.

FIG. 9 is a similar schematic illustration of an alternative exemplary embodiment of the rotor. Said rotor 41 likewise has a warm rotor core 31 and two coil devices arranged thereon with cryogenically operated superconductors. By contrast to the example of FIG. 8, the axial end-side connecting members are in this case designed not as straight conductor members but as bent conductor members with a constant bend radius. Overall, the coil devices 1 thus each have a cylindrical-shell-like basic shape.

The two different basic shapes for the superordinate coil elements 1 as shown in FIGS. 8 and 9 can be easily implemented through corresponding bending of the hollow tubes that support the windings. The corresponding shaping of said hollow tubes is basically possible either before or after the application of the helical winding.

LIST OF REFERENCE DESIGNATIONS

1 Coil device
3 Hollow tube
5 Superconductive conductor
7 Coolant channel
11 Individual conductor
13 Holding element
15 Bandage
17 Thermal insulation layer
21 Axial coil member
23 End-side connecting member
25 Connecting piece
27 Lateral coolant connectors
31 Rotor core
33 Holding pin
35 Guide tube
37 Sleeve
39 Spring element
41 Rotor
43 Groove
α Angle
a Local helix axis
A Coil axis
B Rotor axis
L Length of the coil
r Bend radius of the hollow tube
w Subordinate turn of the helix
W Width of the coil

The invention claimed is:

1. An electrical coil device comprising:
   a winding carrier which is formed from an elongate hollow tube and which is shaped in the manner of a ring, such that, overall, a superordinate loop of the coil device is formed by the ring shape of the winding carrier,
   a winding which is applied to the winding carrier and which is composed of a superconductive conductor,
   a coil axis, and
   two axial coil members which extend parallel to the coil axis,
   wherein the superconductive conductor is wound in a multiplicity of individual turns helically around the hollow tube, such that the ring shape of the winding carrier results in at least one superordinate turn of the overall helix, and
   wherein the interior of the hollow tube is designed as a coolant channel for the circulation of a fluid coolant,
   wherein, within the axial coil member, the superconductive conductor forms a local angle α of at most 79 degrees with the coil axis.

2. The coil device as claimed in claim 1, further comprising:
   in addition to the two axial coil members, two axially end-side connecting members which are each formed as straight members.

3. The coil device as claimed in claim 1, further comprising:
   in addition to the two axial coil members, two axially end-side connecting members which are each formed as bent members.

4. The coil device as claimed in claim 1,
   wherein the hollow tube has a round cross-sectional shape.

5. The coil device as claimed in claim 1,
   wherein the coil device is in the form of a coil device for an electric machine.

6. A rotor for an electric machine, comprising:
   at least one coil device as claimed in claim 1.

7. The rotor as claimed in claim 6, further comprising:
   a cooling system for cooling the superconductive conductor to a cryogenic operating temperature,
   wherein the cooling system is configured to circulate the fluid coolant in the coolant channel of the coil device.

8. The rotor as claimed in claim 6, further comprising:
a rotor core on which the at least one coil device is mechanically held, wherein the rotor core is designed to be kept at a warm operating temperature during the operation of the rotor.

9. The rotor as claimed in claim 8,
wherein the rotor core has at least one groove for receiving the coil device.

10. An electrical coil device comprising:
a winding carrier which is formed from an elongate hollow tube and which is shaped in the manner of a ring, such that, overall, a superordinate loop of the coil device is formed by the ring shape of the winding carrier, and
a winding which is applied to the winding carrier and which is composed of a superconductive conductor,
wherein the superconductive conductor is wound in a multiplicity of individual turns helically around the hollow tube, such that the ring shape of the winding carrier results in at least one superordinate turn of the overall helix, and
wherein the interior of the hollow tube is designed as a coolant channel for the circulation of a fluid coolant,
wherein the hollow tube has an inner diameter of at most 50 mm.

11. A rotor for an electric machine, comprising:
at least one coil device as claimed in claim 10.

12. The rotor as claimed in claim 11, further comprising:
a cooling system for cooling the superconductive conductor to a cryogenic operating temperature,
wherein the cooling system is configured to circulate the fluid coolant in the coolant channel of the coil device.

13. An electrical coil device comprising:
a winding carrier which is formed from an elongate hollow tube and which is shaped in the manner of a ring, such that, overall, a superordinate loop of the coil device is formed by the ring shape of the winding carrier, and
a winding which is applied to the winding carrier and which is composed of a superconductive conductor,
wherein the superconductive conductor is wound in a multiplicity of individual turns helically around the hollow tube, such that the ring shape of the winding carrier results in at least one superordinate turn of the overall helix, and
wherein the interior of the hollow tube is designed as a coolant channel for the circulation of a fluid coolant,
wherein the superconductive conductor comprises at least one strip conductor,
wherein the thickness of the strip conductor is at most 150 µm.

14. A rotor for an electric machine, comprising:
at least one coil device as claimed in claim 13.

15. The rotor as claimed in claim 14, further comprising:
a cooling system for cooling the superconductive conductor to a cryogenic operating temperature,
wherein the cooling system is configured to circulate the fluid coolant in the coolant channel of the coil device.

16. An electrical coil device comprising:
a winding carrier which is formed from an elongate hollow tube and which is shaped in the manner of a ring, such that, overall, a superordinate loop of the coil device is formed by the ring shape of the winding carrier, and
a winding which is applied to the winding carrier and which is composed of a superconductive conductor,
wherein the superconductive conductor is wound in a multiplicity of individual turns helically around the hollow tube, such that the ring shape of the winding carrier results in at least one superordinate turn of the overall helix, and
wherein the interior of the hollow tube is designed as a coolant channel for the circulation of a fluid coolant,
wherein the hollow tube has, at least in certain portions, a bend radius of less than 100 mm.

17. A rotor for an electric machine, comprising:
at least one coil device as claimed in claim 16.

18. The rotor as claimed in claim 17, further comprising:
a cooling system for cooling the superconductive conductor to a cryogenic operating temperature,
wherein the cooling system is configured to circulate the fluid coolant in the coolant channel of the coil device.

* * * * *